(12) United States Patent
Hill et al.

(10) Patent No.: US 6,975,639 B1
(45) Date of Patent: Dec. 13, 2005

(54) QOS SHAPING/PROVISIONING FOR DATA COMMUNICATION SWITCH

(75) Inventors: Rex Hill, San Diego, CA (US); Dante Cinco, San Diego, CA (US)

(73) Assignee: Alcatel, Paris (FR)

( * ) Notice: Subject to any disclaimer, the term of this patent is extended or adjusted under 35 U.S.C. 154(b) by 960 days.

(21) Appl. No.: 09/721,101

(22) Filed: Nov. 21, 2000

Related U.S. Application Data (60) Provisional application No. 60/234,028, filed on Sep. 20, 2000.

(51) Int. Cl.[7] .......................... H04L 12/28; H04L 12/56
(52) U.S. Cl. .................... 370/412; 370/413; 370/415; 370/416; 370/417; 370/429; 370/444
(58) Field of Search ................................ 370/412–419, 370/395.1, 429, 444

(56) References Cited

U.S. PATENT DOCUMENTS

| | | | |
|---|---|---|---|
| 6,424,657 B1 * | 7/2002 | Voit et al. .................... | 370/412 |
| 6,606,311 B1 * | 8/2003 | Wang et al. .................. | 370/338 |
| 6,643,260 B1 * | 11/2003 | Kloth et al. ................. | 370/235 |
| 6,654,373 B1 * | 11/2003 | Maher, III, et al. .......... | 370/392 |
| 6,693,909 B1 * | 2/2004 | Mo et al. ..................... | 370/392 |

FOREIGN PATENT DOCUMENTS

| | | |
|---|---|---|
| WO | WO 00/03256 A1 | 1/2000 |
| WO | WO 00/56024 A2 | 9/2000 |

* cited by examiner

*Primary Examiner*—Dang Ton
*Assistant Examiner*—Inder Pal Mehra
(74) *Attorney, Agent, or Firm*—Craig A. Hoersten; V. Lawrence Sewell

(57) ABSTRACT

A method and apparatus provides QoS shaping/provisioning scheme for a data communications switch, such as a Diff-Serv aware router or a 802.1Q aware bridge, in which distinct internal and outbound priority values are assigned to a packet based on flow properties associated with an inbound packet. The flow properties used to assign the internal and outbound priority values may include at least one value from a packet field that is not dedicated to defining QoS. The internal priority value provides a priority to the packet during processing in the switch. The outbound priority value is applied to the packet in lieu of the inbound priority value prior to transmitting the packet from the switch. The flow properties used to determine the internal and outbound priority values may include, for example, Layer 2, Layer 3, and Layer 4 information encoded in the packet.

18 Claims, 6 Drawing Sheets

QOS SHAPING/PROVISIONING FOR DATA COMMUNICATION SWITCH

CROSS-REFERENCE TO RELATED APPLICATIONS

This application claims the benefit of the filing date of U.S. provisional patent application (Application No. 60/234,028), filed Sep. 20, 2000 and entitled "High Speed LAN Switching Controller," the contents of which are hereby incorporated by reference. This application contains subject matter related to U.S. patent application Ser. No. 09/718,696 filed Nov. 21, 2000 and entitled "Stage-Implemented QoS Shaping for Data Communication Switch."

FIELD OF THE INVENTION

The present invention relates to devices for determining the Quality of Service (QoS) in a data communications switch, and especially to devices for determining the internal and outbound QoS based on a number of flow properties.

BACKGROUND OF THE INVENTION

IEEE (Institute of Electrical and Electronics Engineers) Standard 802.1Q entitled "Virtual Bridged Local Area Networks" publication date of Mar. 8, 1999, defines an industry standard for virtual bridged local area networks (VLANs). The 802.1Q standard, among other things, defines a convention for adding a tag header to a Layer 2 data packet, i.e. a "frame", in the creation of an 802.1 Q-compliant packet. The tag header may include, among other things, a VLAN Identifier and a priority value assigned to the packet. The VLAN Identifier typically determines what LAN devices are authorized to receive the packet, and the priority value typically determines how fast the packet will be received by the authorized LAN devices relative to other packets.

As an 802.1Q-compliant packet passes through each bridge in a bridged LAN, the priority value in the inbound packet may be "regenerated" by the bridge to determine a corresponding priority value for the outbound packet. According to the standard, the outbound priority value may be independently determined on each bridge as a function of the port on which the bridge receives the packet and the inbound priority value. There is no provision in the standard, however, to take into account values from fields in the packet that are not dedicated to defining quality of service (QoS) when assigning the outbound priority value.

Therefore, it is desirable to take into account values from fields in the packet that are not dedicated to defining QoS when assigning the outbound priority value. It may also be desirable to assign distinct internal and outbound priority values to the packet, the former for application in prioritizing the packet on the current bridge and the latter for application to the packet as transmitted from the current bridge.

SUMMARY OF THE INVENTION

In one embodiment of the present invention, a quality of service (QoS) shaping and provisioning method for a switch having a plurality of ports is provided. The method includes the steps of receiving a packet having a first priority value on a first port, determining a second priority value for the packet based on one or more flow properties including at least one value from a packet field that is not dedicated to defining QoS, and processing the packet based on the second priority value.

In another embodiment of the present invention, a QoS shaping and provisioning method for a switch having a plurality of ports is provided. The method includes the steps of receiving a packet having a first priority value on a first port, determining a second priority value for the packet based on one or more flow properties including at least one value from a packet field that is not dedicated to defining QoS, and applying the second priority value to the packet prior to transmission from the switch.

In yet another method of the present invention, a QoS shaping and provisioning method for a switch having a plurality of ports is provided. The method includes the steps of receiving a packet having a first priority value on a first port, determining a second priority value for the packet based on one or more flow properties, processing the packet based on the second priority value, determining a third priority value for the packet based on the one or more flow properties, and applying the third priority value to the packet prior to transmission from the switch.

In yet another embodiment of the present invention, a switch having one or more switching modules that are capable of QoS shaping and provisioning is provided. Each switching module includes one or more ports for receiving a plurality of inbound packets and for transmitting a plurality of outbound packets, an access controller coupled to the input ports for receiving the inbound packets, each inbound packet having an inbound priority value and a plurality of flow properties, and a switching controller coupled to the access controller for receiving the inbound packets from the access controller, for generating one or more packet priority values based on the plurality of flow properties, and for providing the outbound packets to the ports to be transmitted.

BRIEF DESCRIPTION OF THE DRAWINGS

These and other aspects of the invention may be understood by reference to the following detailed description, taken in conjunction with the accompanying drawings, which are briefly described below.

DETAILED DESCRIPTION

One embodiment of the present invention provides a QoS shaping/provisioning scheme for a switch, such as 802.1Q aware bridge. The QoS shaping/provisioning scheme broadly includes many aspects of QoS-related tasks, and may include but not limited to priority shaping, link sharing, bandwidth provisioning and bandwidth limiting. The switch may also be referred to as a data communication switch.

An analogous QoS shaping/provisioning scheme may also be applied to other types of switches, such as DiffServ (differentiated services) aware routers. In DiffServ aware routers, the QoS shaping/provisioning scheme may be implemented with respect to a DiffServ field in the header of a Layer 3 packet, e.g. IP datagram, as specified in IETF Request for Comment 2475 entitled, "An Architecture for Differentiated Services" (RFC 2475).

In one embodiment of the present invention, distinct internal and outbound QoS values preferably are assigned by a switch to an inbound packet based on a plurality of flow properties associated with the inbound packet.

QoS is typically defined by fields, such as, for example, (1) the 3-bit 802.1Q tag field in Layer 2, (2) the 8-bit Type of Service (ToS) field in Layer 3, and (3) the 6-bit DiffServ in Layer 3 that are dedicated to defining QoS.

The flow properties preferably also include, but are not limited to, at least one value from a packet field that is not dedicated to defining QoS. For example, the plurality of flow properties used to determine the internal and outbound QoS values may include Data Link Layer (Layer 2), Network layer (Layer 3) and Transport Layer (Layer 4) information in the packet at the time of receiving the inbound packet on the switch as well as other values that may be derived from Layer 2, Layer 3 and Layer 4 information during processing of the packet.

For example, the values from packet fields that are not dedicated to defining QoS, which are used to determine internal and outbound QoS values, may include but are not limited to source and destination addresses such as Layer 2 and Layer 3 addresses as well as Layer 4 port numbers, which may also be referred to as socket IDs. Other flow properties that are not dedicated to defining QoS but are used to determine internal and outbound QoS values may include values not necessarily in the packet header but are derived during the classification process, such as, for example, the physical port number on which the packet arrived and the VLAN Identifier onto which the packet is classified.

For example, for a server and a PC connected to a switch through the same port and requesting the same priority, it may be desirable to respect the server's requested priority while overriding the PC's requested priority. On the other hand, it may be desirable to respect both the server's and PC's requested priority when transmitting the packet from the current switch but to override the PC's requested priority when prioritizing the packet on the current switch. The switch may distinguish between packets from the server and the PC based on values such as Layer 2 and Layer 3 addresses.

The internal QoS value preferably is applied to provide the specified QoS to the inbound packet while being processed in the switch, whereas the outbound QoS value preferably is applied to the inbound packet in lieu of the inbound QoS value prior to transmitting the inbound packet from the switch as an outbound packet. For example, packets having higher internal priorities may receive expedited processing, expedited queuing and/or preferential bandwidth treatment.

The inbound QoS value, the internal QoS value and the outbound QoS value may, for example, also be referred to as an inbound priority value, an internal priority value and an outbound priority value, respectively. The inbound QoS value and the outbound QoS value may also be referred to as an ingress priority value and an egress priority value, respectively, or as an ingress QoS value and an egress QoS value, respectively. The inbound packet and the outbound packet may, for example, also be referred to as an ingress packet and an egress packet, respectively.

Figure 1:
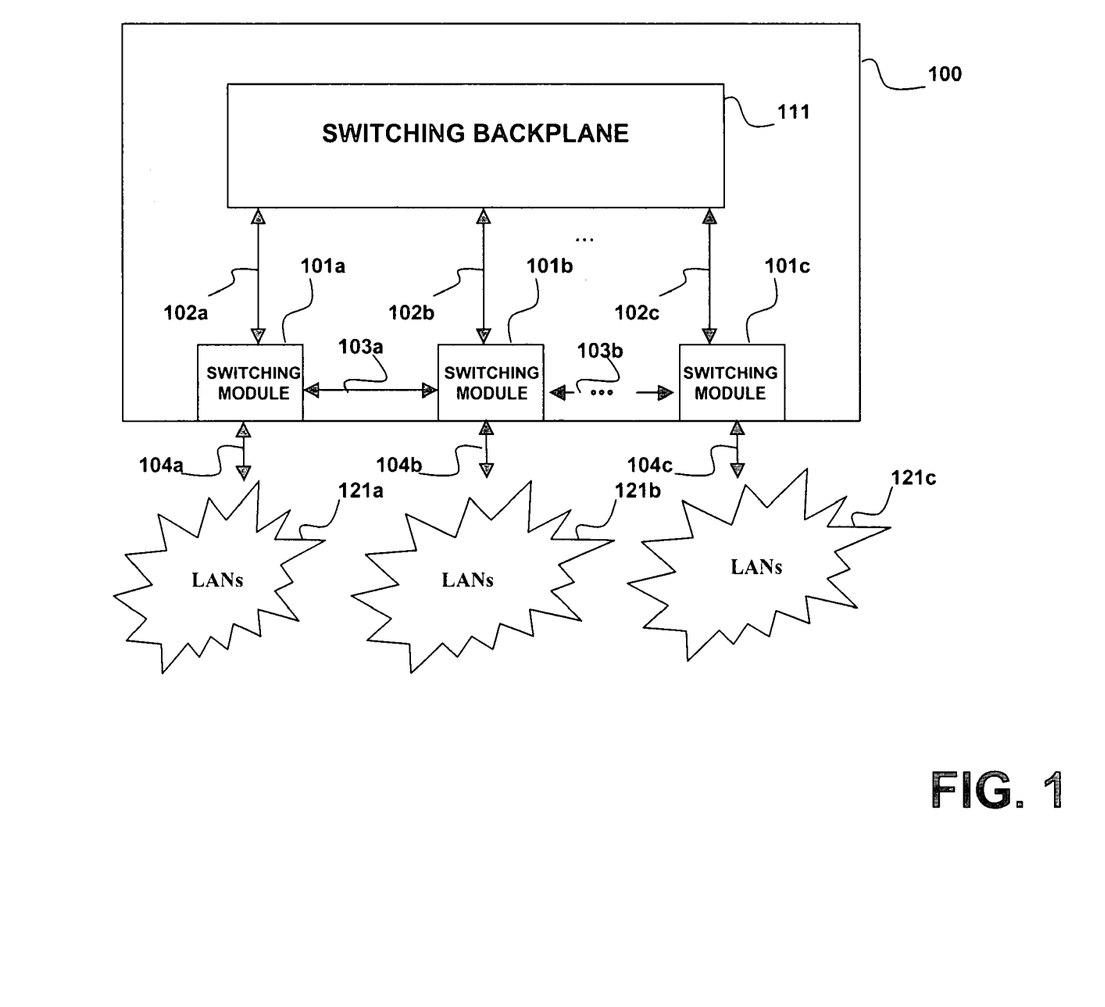
FIG. 1 is a switch in one embodiment of the present invention.

FIG. 1 illustrates a switch 100 in one embodiment of the present invention. Switch 100 preferably includes a switching backplane 111 coupled to switching modules 101*a*–101*c*. The switching backplane 111 may include a switching fabric, or switching fabric functions may be distributed between the switching backplane and the switching modules. The switching fabric (not shown) may also interface between the switching backplane 111 and the switching modules 101*a*–101*c*.

The switching modules 101*a*–101*c* preferably are coupled to one another over control paths 103*a* and 103*b*, respectively, and each switching module preferably is associated with one or more LANs 121*a*–121*c*. The LANs 121*a*–121*c* preferably include one or more virtual local area networks (VLANs). The switching modules communicate with the LANs over data interfaces 104*a*–104*c*.

The switching modules preferably interface with the switching backplane 111 over data paths 102*a*–102*c*, respectively. The switching modules preferably transmit packet data to the switching backplane 111 and receive packet data from the switching backplane 111. Depending on the source and destination addresses, an inbound packet from a switching module may be provided over the switching backplane 111 as an outbound packet to the same or different switching module.

The switching modules 101*a*–10*c* and the LANs 121*a*–121*c* are shown for illustrative purposes only. There may actually be more or less switching modules and LANs in this and other embodiments of the present invention. Further, in other embodiments, the switch may have a configuration that is different from the configuration of the switch 100 of FIG. 1.

Figure 2:
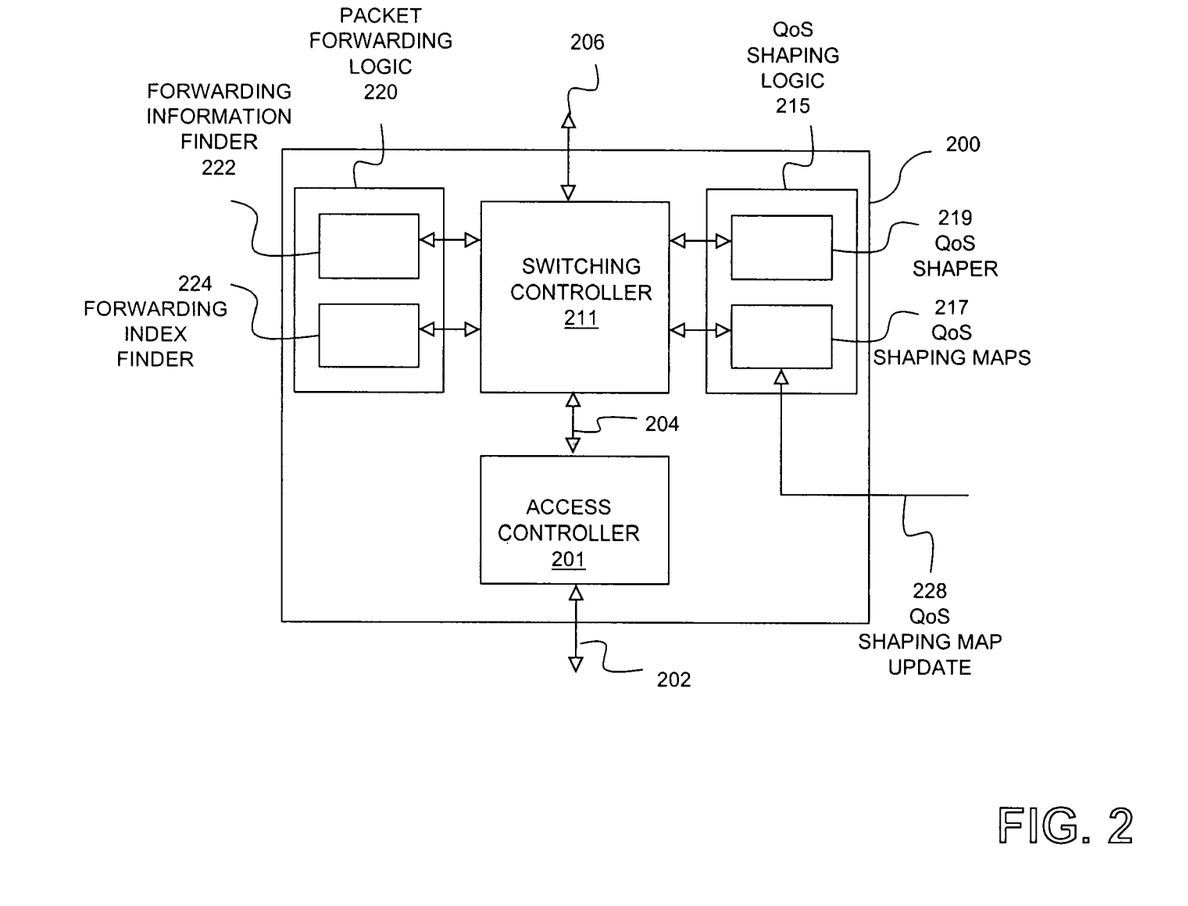
FIG. 2 is a switching module, which may be used to in the switch of FIG. 1.

FIG. 2 is a switching module 200 in one embodiment of the present invention. The switching module 200 may be used as one of the switching modules 101*a*–10*c* of FIG. 1. The switching module 200 preferably includes a stage-implemented QoS shaping scheme in which packet processing and QoS shaping/provisioning scheme are performed in multiple stages. The switching module 200 includes an access controller 201 coupled to one or more LANs over one or more data interfaces 202 and a switching controller 211 over an internal interface 204. The LANs may include VLANs.

The access controller 201 may include a media access controller (MAC). The access controller 201 preferably receives inbound packets from the LANs, formats them, and transmits them to the switching controller 211. The access controller 201 preferably also receives outbound packets from the switching controller 211, formats them, and transmits them to the LANs.

The switching module 200 preferably also includes other elements that are used to facilitate packet processing operations. These switch elements preferably include but are not limited to a packet forwarding logic 220 and a QoS shaping logic 215. The QoS shaping logic 215 and the packet forwarding logic 220 preferably are coupled to the switching controller 211. The switching module 200 may also include other sub-modules for performing various different tasks.

The switching module 200 preferably is an ingress buffered switch, in which most of the large buffers are located at the inbound side. Thus, internal and outbound priority value determinations preferably are made at the inbound side where most of the buffers are located. In other embodiments, determination of the internal and outbound priority values may be done at the outbound side. In still other embodiments, determination of the internal and outbound priority values may be performed by distributed processing, in which some of the processing for determination of the priority values is done at the inbound side and some processing is done at the outbound side. If the priority values are added to the packet header, for example, QoS shaping/ provisioning may be performed at the outbound side using outbound buffers.

QoS shaping may also be performed at the outbound side in order to perform true shaping. True shaping typically requires that packets wait very close to the link on which they are going to be transmitted and typically also requires a sort operation on those packets. When there is a huge set of packets waiting around in the outbound buffers, QoS shaping may be desirable to figure out which packet to send next.

The switching controller 211 preferably receives inbound packets, preferably subjects selected ones of them to internal and outbound QoS shaping, and transmits selected ones of them to the access controller 201 over the internal interface 204. In this embodiment, QoS shaping preferably is provided with the assistance of the QoS shaping logic 215 and the packet forwarding logic 220. In other embodiments, QoS shaping may be provided using other elements and/or logic.

An inbound packet to the switching controller 211 typically has an inbound priority value in the Layer 2 802.1Q/p header or the Type of Service (ToS) field in the Layer 3 IP header. The fields including three bits from either the 802.1Q/p header or the IP header may be used, but both fields typically are not used at the same time. For example, the inbound priority may be included in a 3-bit ToS precedence (ToSp) sub-field of the ToS field. The ToS field in the IP header may also be referred to as a differentiated services code point (DSCP) field or a DiffServ field.

When the inbound packet enters the switching controller 211, the switching controller preferably provides the inbound packet header to the packet forwarding logic 220. In other embodiments, the switching controller may provide the whole inbound packet to the packet forwarding logic. The packet forwarding logic includes a forwarding information finder 222 and a forwarding index finder 224. The forwarding information finder 222 may also be referred to as a header cache, and the forwarding index finder 224 may also be referred to as a look up engine or a pseudo-cam (pseudo-content addressable memory).

The forwarding index finder 224 preferably receives the inbound packet header. The forwarding index finder 224 preferably uses the Layer 2, 3, or 4 header information to access a routing table for an index. Addressing and other information in the header that is used to look up the index is also referred as a key or as an input key. The forwarding index finder preferably classifies the packet into a flow, which has an index associated with it. The index for the flow may also be referred to as an ID or a flow ID. Each flow preferably is associated with a unique index, and the packets that are classified onto the same flow preferably are associated with the same index. Each flow preferably is also associated with a priority class, which is going to be described in detail later in reference to internal and outbound priority mappings.

The forwarding index finder 224 preferably provides the index to the switching controller 211. The switching controller 211 preferably uses the index to look up a table entry in a large table associated with the forwarding information finder 222. The large table associated with the forwarding information finder may include, e.g., a next hop header table (NHHT).

The table entry, which may also be referred to as a flow descriptor, preferably has a number of fields for each packet on the flow. The table entry may contain information for performing tasks such as, for example, queue ID (QID) to specify the port number to be used by an outbound packet, maximum frame length, whether or not to perform 802.1Q tag stripping, and whether or not the packet will be processed by software. For example, the table entry in one embodiment preferably contains Layer 2 and Layer 3 information such as information on how to modify the header, VLAN ID, and a 6-bit priority description index (PDI), which may also be referred to as a QoS shaping index. In other embodiments, the table entry may also contain Layer 4 information. The PDI preferably facilitates mapping of inbound packets to different priority classes. In other embodiments, the number of bits in the PDI may be more or less than six.

The table entry preferably is then provided to the switching controller 211 to be used to further process the inbound packet. The switching controller preferably also provides the table entry to the QoS shaping logic 215 for packet processing including but not limited to priority shaping, link sharing, bandwidth provisioning and bandwidth limiting. The QoS shaping logic 215 includes QoS shaping maps 217 and a QoS shaper 219. The QoS shaper may include a queue manager, and functions of the QoS shaper may be distributed throughout the switching modules and the switching fabric (not shown) that interfaces between multiple switching modules. The QoS shaping maps 217 preferably receive the PDI and the 3-bit inbound priority value from the packet and preferably performs a table lookup for internal and outbound priority values.

Figure 3:
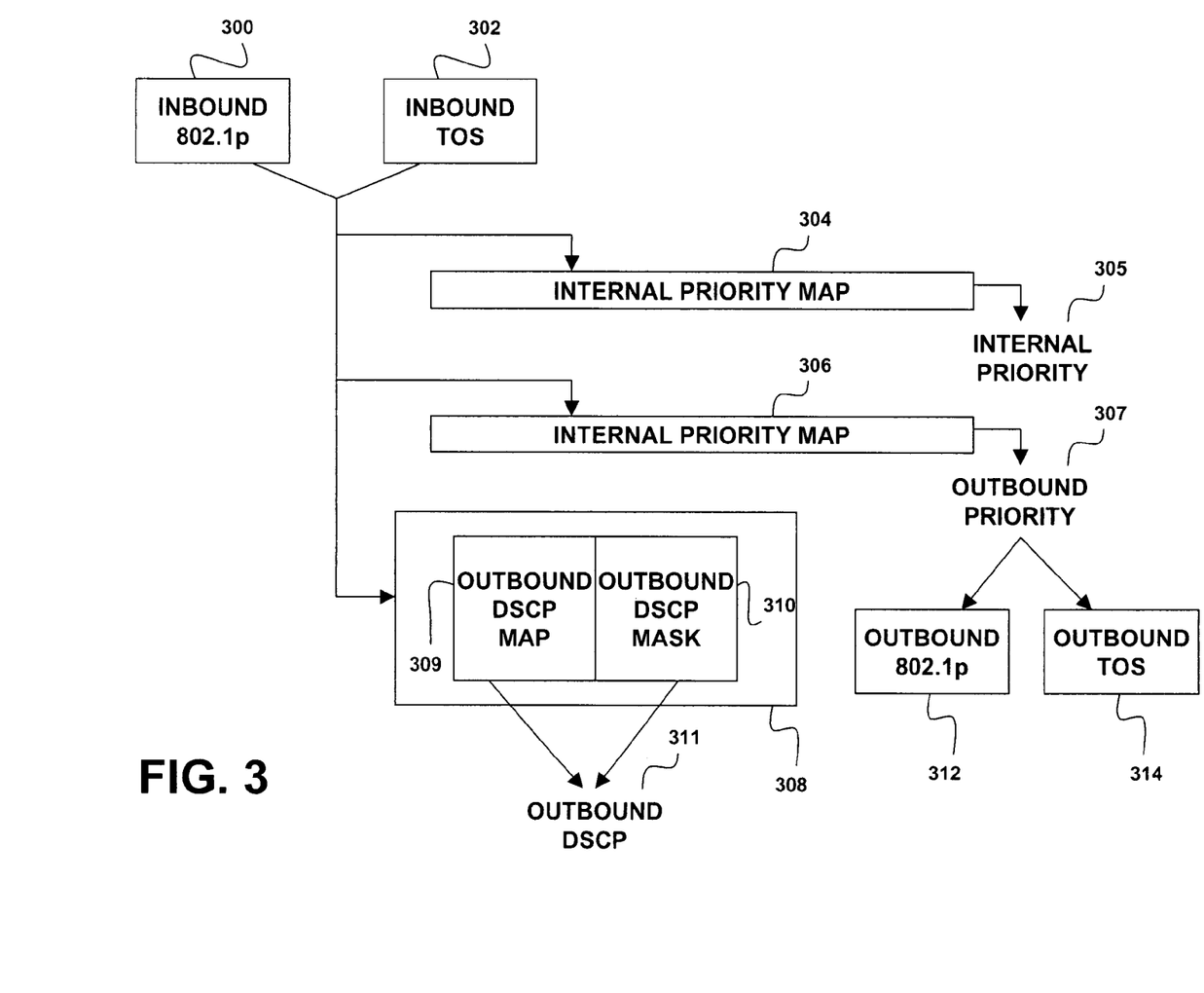
FIG. 3 illustrates mapping of inbound priority values into outbound priority values in one embodiment of the present invention.

FIG. 3 is an exemplary block diagram illustrating mapping of inbound 802.1p priority value and an inbound ToS priority value into an internal priority value, an outbound 802.1p priority value, an outbound ToS priority value, and an outbound DSCP (differentiated services code point).

The inbound priority values represented by inbound 802.1p value 300 and an inbound ToS value 302 preferably are used to derive an internal priority value 305 and an outbound priority value 307. The inbound 802.1p value is included in Layer-2 802.1Q/p header, and the ToS value is included in Layer-3 IP header. Depending on the mode of operation, the inbound priority value used may be the inbound 802.1p priority value 300 or the inbound ToS priority value 302. In addition, the outbound priority value 307 may be an outbound 802.1p priority value 312 or an outbound ToS priority value 314.

In other embodiments, the inbound 802.1p value and the inbound ToS value may also be provided to a DSCP table 308. For example, an 8-bit inbound DSCP value may be identical to the 8-bit inbound ToS value. The DSCP table 308 includes an outbound DSCP map 309 and an outbound DSCP mask 310. An outbound DSCP value 311 preferably is provided, depending on the mode of operation, either as a DSCP value in the table entry of the forwarding information finder, or as the modified inbound DSCP value. The inbound DSCP value may be modified through mapping to the DSCP map 309 and the outbound DSCP mask 310, wherein the DSCP mask may be used to modify some of the bits in the DSCP map.

Figure 4:
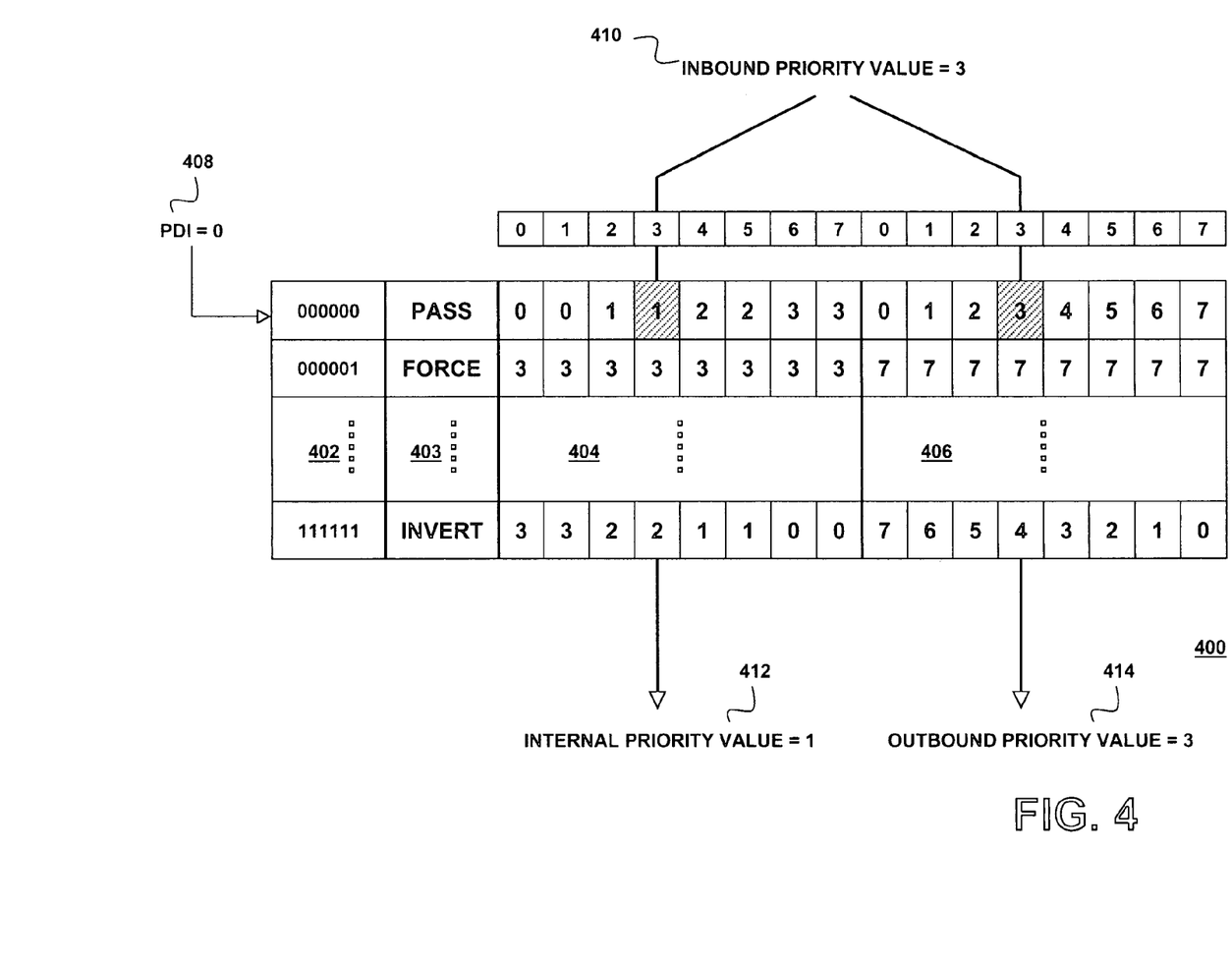
FIG. 4 is QoS shaping maps in one embodiment of the present invention.

FIG. 4 illustrates a set of shaping maps 400 within the QoS Shaping Maps 217 in one embodiment of the present invention. The QoS Shaping Maps 217 include a plurality of priority descriptor rows. The shaping maps 400 include internal priority maps 404 and outbound priority maps 406. Each priority descriptor row in this embodiment preferably includes an internal priority map including eight 2-bit values, and an outbound priority map including eight 3-bit values. Since the PDI is six bits in size in this embodiment, there may be up to 64 possible different priority descriptor rows that may be accessed using the PDI as an index. In other embodiments, the PDI may be more or less than six bits in size, and correspondingly, there may be more or less than 64 possible different priority descriptor rows.

Since internal priority values have only two bits and can have values between 0–3 in this embodiment, the 3-bit inbound priority values preferably are mapped to a 2-bit value during internal priority mapping. On the other hand, since outbound priority values have three bits, the inbound priority values may be mapped to the outbound priority values without losing any significant bits.

Each priority descriptor row preferably is associated with a priority class. The priority classes preferably are derived during packet classification from information in the packet header such as Layer 2 and Layer 3 source and destination addresses and Layer 4 port numbers. Each priority class preferably has the internal and outbound priority mapping values that are different from the internal and outbound priority mapping values of other priority classes. In other embodiments, two or more priority descriptor rows associated with different priority classes may have the same internal and/or outbound priority mapping values.

For example, in this embodiment, the priority classes may include PASS, FORCE and INVERT classes 403 associated with priority descriptor indices (PDIs) 402. These priority classes, for example, may be selected based on the source addresses of the inbound packets.

Each of the PDIs 402 preferably is associated with a particular priority class. For example, in FIG. 4, the priority index <000000> is associated with the PASS class, the priority index <000001> is associated with the FORCE class, and the priority index <111111> is associated with the INVERT class. Further, the PASS class may be associated with a server, the FORCE class may be associated with a PC, and the INVERT class may be associated with an erroneously configured network device.

As the name "pass" suggests, the outbound priority map associated with the PASS class preferably passes the inbound priority value and provides as an outbound priority value. Since only two bits are available in each internal priority value in this embodiment, two most significant bits of the inbound priority values preferably are used as internal priority values.

As the name "force" suggests, the internal and outbound priority maps associated with the FORCE class preferably force the internal and outbound priority values to 3 and 7, respectively. In other embodiments, other internal and outbound priority values may be associated with the FORCE class. In still other embodiments, there may be multiple different FORCE classes having different internal and outbound priority values.

As the name "invert" suggests, the internal priority map associated with the INVERT class preferably inverts the two most significant bits of the inbound priority value to provide as an internal priority value. Further, the outbound priority map inverts the entire inbound priority value to provide as an outbound priority value.

For example in FIG. 4, an internal priority map of <0, 0, 1, 1, 2, 2, 3, 3> and an outbound priority map of <0, 1, 2, 3, 4, 5, 6, 7>, respectively, are provided for PDI of <000000>. Therefore, when the inbound packet with a source address having the priority class of PASS is received, it may be provided with the PDI of <000000>. If that inbound packet has an inbound priority value of 3, the inbound priority value is mapped to an internal priority value of 1 and an outbound priority value of 3. Similarly, when inbound packets with source addresses having the priority classes of FORCE and INVERT are received, they may be provided with the PDI of <000001> and <111111>, respectively. Other priority classes and other methods of mapping may be used in other embodiments.

If a new set of mapping data is desired, the user may use a QoS shaping map update interface 228 of FIG. 2 to enter new internal and/or outbound maps into the shaping maps 400 at a PDI location from <000000> to <111111>. A shaping map update signal as well as the map data for updating may be provided to the QoS shaping maps over the QoS shaping map update interface 228.

In this and other embodiments, flow properties other than the source address, a destination address for example may be used to select the type of mapping used to convert the inbound priority values to internal priority values and outbound priority values, respectively.

Referring back to FIG. 2, after the internal and outbound priority values are identified, the QoS shaping maps 217 preferably return these priority values to the switching controller 211. The switching controller 211 preferably modifies the inbound packet to include the new priorities. The switching controller then sends the inbound packet having the new internal and outbound properties to the QoS shaper 219 so that the inbound packet can be put in an order for transmit as an outbound packet based on its new priority values.

The new outbound priority value is typically not used by the switching module 200. A switching module in a next switch preferably uses this new outbound priority value to generate the next set of internal and outbound priority values.

When the packet's priority is selected based on the new internal priority value, the QoS shaper provides the packet to the switching controller 211, which then provides the packet to the access controller 201 to be transmitted over the data interfaces 202 to the LANs.

Figure 5:
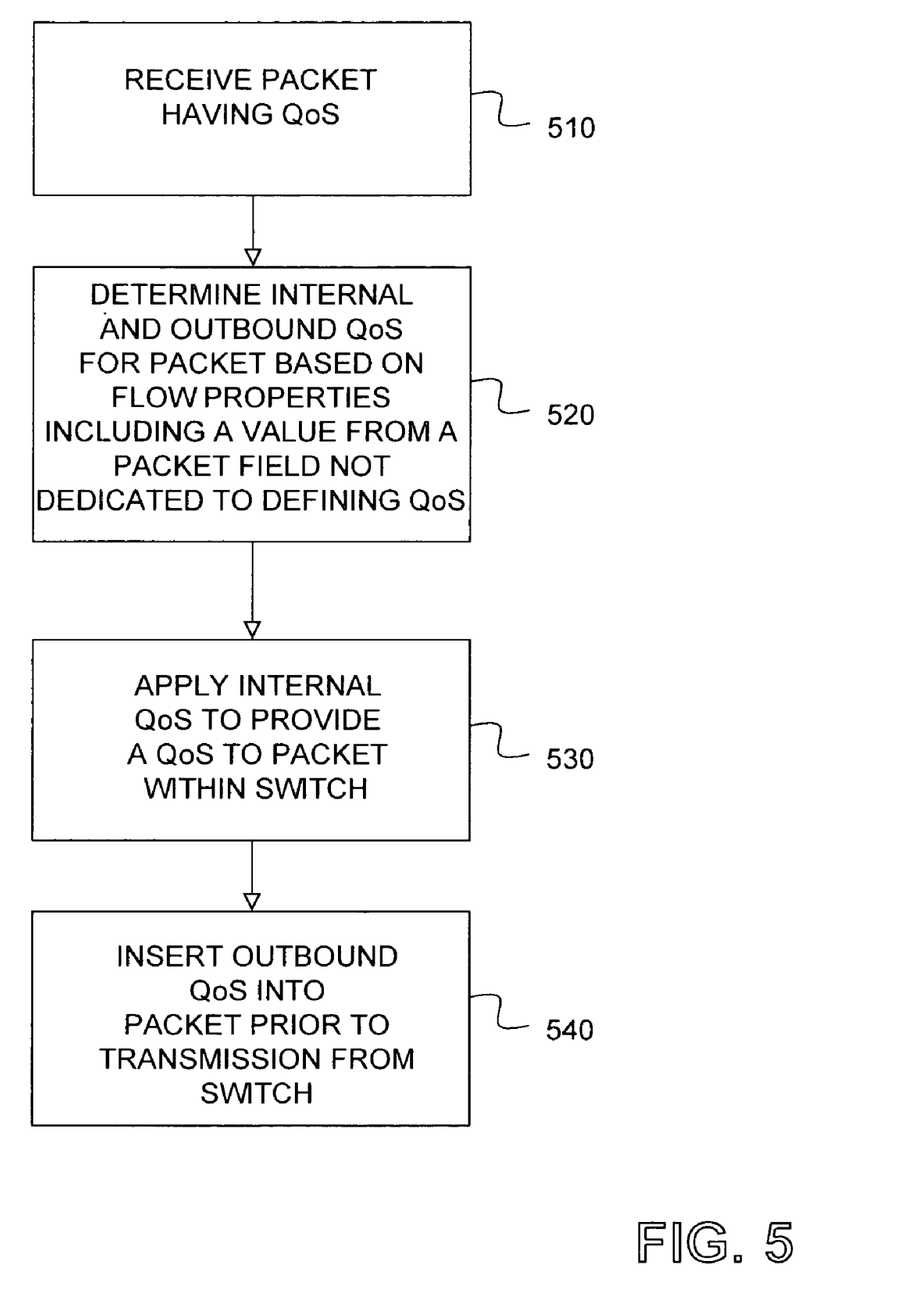
FIG. 5 is a flow diagram describing the QoS shaping/provisioning in accordance with one embodiment of the present invention.

FIG. 5 is a flow diagram of QoS shaping/provisioning in one embodiment of the present invention. An inbound packet having QoS is received by an access controller in a switch in step 510. The access controller, e.g., may be the access controller 201 of FIG. 2. The QoS may include but is not limited to a 802.1p priority value and a ToS priority value. If the inbound packet does not have QoS, it may be given a default priority based on its inbound port and protocol. The default priority may also be based on other flow properties such as Layer 2 and Layer 3 source and destination addresses, as well as Layer 4 port numbers.

The access controller preferably processes the inbound packet and sends it on to a switching controller, which may be similar to the switching controller 211 of FIG. 2. The switching controller in step 520 preferably determines new internal and outbound QoS for the inbound packet based on the flow properties, which may include a value from packet fields that are not dedicated to defining QoS, such as, for example, Layer 2 and Layer 3 source and destination addresses as well as Layer 4 port numbers.

The switching controller 211 in step 530 preferably applies the new internal QoS to the inbound packet to provide a QoS prioritization to the inbound packet within the switch. The switching controller in step 540 inserts the outbound QoS to the inbound packet. The inbound packet is then provided to the switching module coupled with the LAN to which the inbound packet is provided as an outbound packet. The outbound packet is transmitted with the new QoS outbound priority. Depending on source and destination addresses of the packet, the switching module that transmits the outbound packet may be the same or different from the switching module that received the inbound packet, since the inbound packets received by one switching module may be provided to another switching module during packet processing over the switching backplane.

Figure 6:
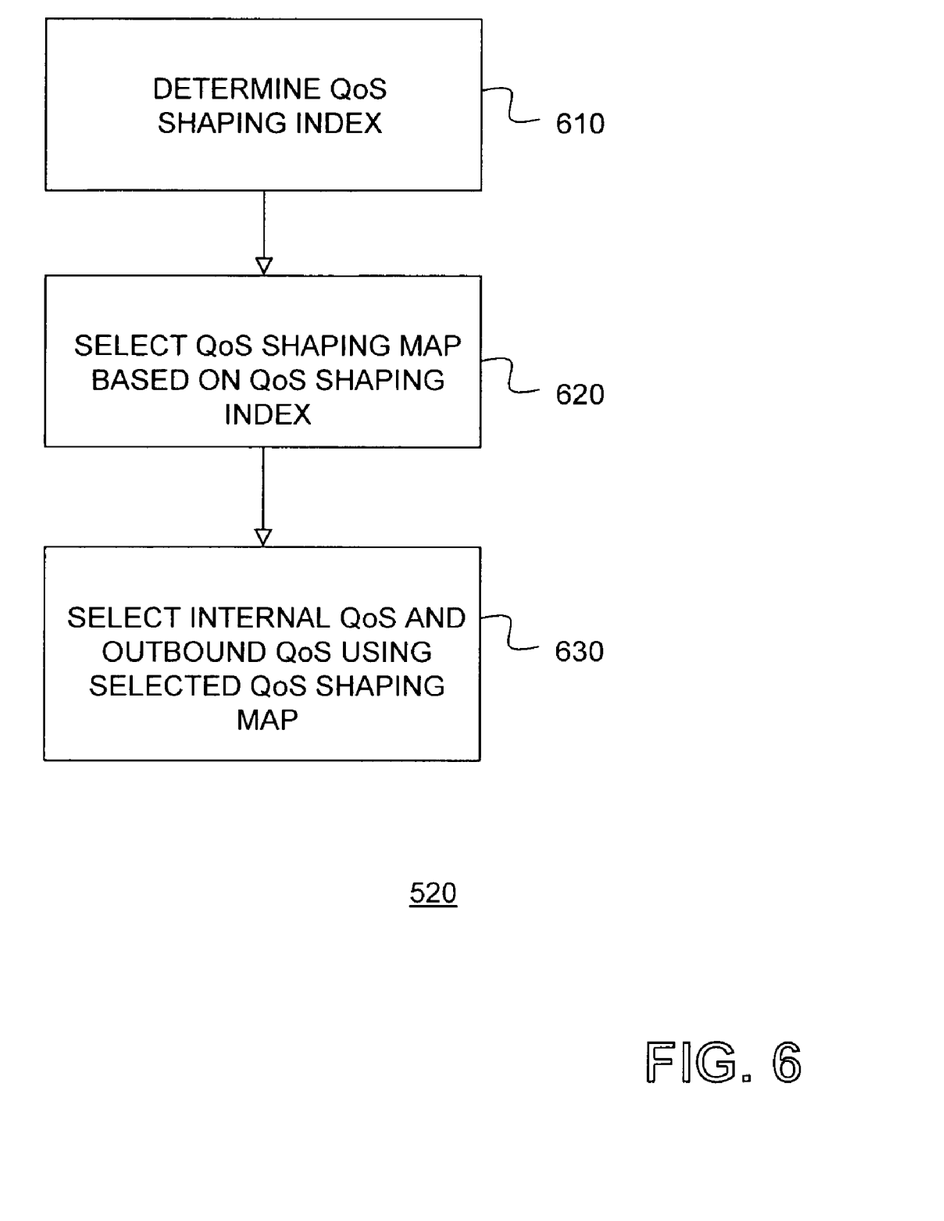
FIG. 6 is a flow diagram describing stage-implemented QoS shaping in accordance with one embodiment of the present invention.

FIG. 6 is a flow diagram of stage-implemented QoS shaping in one embodiment of the present invention. For example, step 520 of FIG. 5 may be implemented in stages as illustrated in FIG. 6. A QoS shaping index preferably is determined from the flow properties of an inbound packet in step 610, for example, in the packet forwarding logic 220 of FIG. 2. Then, an internal and outbound QoS shaping maps, e.g., in the QoS shaping maps 217, preferably are selected based on the QoS shaping index in step 620. Further, internal and outbound QoS values preferably are selected using the inbound QoS in step 630.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

For example, a switch may be used that has a configuration that is different from the switch described in the specification. For example, in the described embodiments, QoS shaping preferably is performed in a QoS shaper of the switching modules. In other embodiments, QoS shaping function may be a distributed process where some or all of QoS shaping is performed in other components such as a switching fabric. Further, in the described embodiments, QoS shaping preferably is performed by the switch during inbound processing of the packets. In other embodiments, QoS shaping may be performed by the switch during outbound processing of the packets. In still other embodiments, some parts of QoS shaping/provisioning may be performed during inbound processing and other parts of QoS shaping/provisioning may be performed during outbound processing.

We claim:

1. A quality of service (QoS) provisioning method for a data communication switch having a plurality of ports, comprising:
   receiving a packet on a first port of the switch;
   mapping information from the packet to a priority descriptor;
   selecting an internal priority value and an outbound priority value using the priority descriptor, wherein the internal priority value and the outbound priority value are different;
   prioritizing the packet while on the switch using the internal priority value;
   appending the packet with the outbound priority value; and
   transmitting the appended packet on a second port of the switch.

2. The method of claim 1, wherein the internal priority value is used to select a forwarding queue on the switch for the packet.

3. The method of claim 1, wherein the outbound priority value is appended to the packet in an 802.1Q tag field.

4. The method of claim 1, wherein the internal priority value has a smaller bit count than the priority descriptor.

5. The method of claim 1, wherein the outbound priority value has a smaller bit count than the priority descriptor.

6. The method of claim 5, wherein the priority descriptor is a six-bit value and the outbound priority value is a three-bit value.

7. The method of claim 1, wherein the information from the packet is selected from one or more Layer 2 or Layer 3 fields.

8. The method of claim 7, wherein at least one of the Layer 2 or Layer 3 fields is not dedicated to defining QoS.

9. A quality of service (QoS) provisioning method for a data communication switch having a plurality of ports, comprising:
   receiving a packet having a plurality of inbound priority values on a first port of the switch;
   determining an internal priority value and an outbound priority value using a selected one of the inbound priority values, wherein the internal priority value and the outbound priority value are different;
   prioritizing the packet while on the switch using the internal priority value;
   appending the packet with the outbound priority value; and
   transmitting the appended packet on a second port of the switch.

10. The method of claim 9, wherein the internal priority value is used to select a forwarding queue on the switch for the packet.

11. The method of claim 9, wherein the outbound priority value is appended to the packet in an 802.1Q tag field.

12. A quality of service (QoS) provisioning method for a data communication switch having a plurality of ports, comprising:
   receiving a packet having an inbound priority value on a first port of the switch;
   mapping information from the packet to a priority descriptor;
   determining a first prioritization for the packet while on the switch using the inbound priority value and the priority descriptor; and
   determining a second prioritization for the packet as transmitted from the switch using at least the priority descriptor appending the packet with the outbound priority value; and transmitting the appended packet on a second port of the switch.

13. The method of claim 12, wherein the step of determining the first prioritization includes determining a forwarding queue on the switch for the packet.

14. The method of claim 12, wherein step of determining the second prioritization includes determining an outbound priority value for appending to the packet as transmitted from the switch.

15. The method of claim 14, wherein the outbound priority value is appended to the packet in an 802.1Q tag field.

16. The method of claim 12, wherein the step of determining the second prioritization includes using the inbound priority value.

17. The method of claim 12, wherein the information from the packet is selected from one or more Layer 2 or Layer 3 fields.

18. The method of claim 17, wherein at least one of the Layer 2 or Layer 3 fields is not dedicated to defining QoS.

* * * * *